(12) United States Patent
Ohmi et al.

(10) Patent No.: US 6,378,192 B1
(45) Date of Patent: Apr. 30, 2002

(54) METHOD OF FIXING A PLURALITY OF LOWER MEMBERS EACH HAVING REFERENCE BORE FOR INSTALLING UPPER MEMBER, AND FIXING JIGS

(75) Inventors: Tadahiro Ohmi, 2-1-17-301, Komegafukuro, Aoba-ku, Sendai, Miyagi; Michio Yamaji; Tsutomu Shinohara, both of Osaka, all of (JP)

(73) Assignees: Fujikin Incorporated, Osaka; Tadahiro Ohmi, Miyagi, both of (JP)

( * ) Notice: Subject to any disclaimer, the term of this patent is extended or adjusted under 35 U.S.C. 154(b) by 0 days.

(21) Appl. No.: 09/679,890

(22) Filed: Oct. 5, 2000

Related U.S. Application Data

(62) Division of application No. 09/168,859, filed on Oct. 9, 1998, now Pat. No. 6,199,260.

(30) Foreign Application Priority Data

Oct. 13, 1997 (JP) ............................................... 9-278472

(51) Int. Cl.⁷ .................................................. B23Q 3/00
(52) U.S. Cl. ............................. 29/464; 29/271; 269/47; 33/613
(58) Field of Search ........................ 29/271, 464, 466, 29/407.09, 407.1, 465, 468; 269/47, 52, 37, 40, 43; 33/613, 562

(56) References Cited

U.S. PATENT DOCUMENTS

| 1,268,556 A | * | 6/1918 | Essick |
| 2,666,266 A | * | 1/1954 | Sinhel |
| 3,111,769 A | | 11/1963 | Carlisle et al. |
| 3,287,813 A | * | 11/1966 | Lennon et al. |
| 3,722,360 A | * | 3/1973 | Blakey et al. |
| 3,785,057 A | * | 1/1974 | Streander |
| 4,202,106 A | * | 5/1980 | Olson |
| 4,397,094 A | | 8/1983 | Nakamura |
| 4,628,577 A | | 12/1986 | Dahlgren et al. |
| 4,744,140 A | | 5/1988 | Bright |
| 4,829,727 A | | 5/1989 | Kuzara, Jr. |
| 5,068,976 A | * | 12/1991 | Bell |
| 5,237,739 A | | 8/1993 | Clark |
| 5,407,182 A | | 4/1995 | Hartley |
| 5,491,905 A | | 2/1996 | Jablonski et al. |
| 5,637,129 A | | 6/1997 | Warnecke |
| 5,992,028 A | * | 11/1999 | Wing |
| 6,185,830 B1 | * | 2/2001 | Walters |

FOREIGN PATENT DOCUMENTS

| DE | 142825 | 7/1980 |
| EP | 0 745 918 A2 | 12/1996 |
| JP | 155328 | 8/1995 |

* cited by examiner

*Primary Examiner*—David P. Bryant
(74) *Attorney, Agent, or Firm*—Armstrong, Westerman & Hattori, LLP

(57) ABSTRACT

First and second two spacing jigs 81 are used each having a rectangular parallelepipedal body 81a formed on the bottom surface thereof with projections 82 which are arranged side by side at a spacing equal to a predetermined interval between reference bores 106. First, the projections 82 of the first jig 81 are fitted in front reference bores 106 of respective lower members 31, 32, 33, and the projections 82 of the second jig 82 in rear reference bores 106 of the lower members. A right angle holding jig 84 in the form of a rectangular frame and having inner side faces positionable respectively in contact with the front side face of the first jig 81, the rear side face of the second jig 81 and the left and right side faces of the two jigs 81 is fitted around the bodies 81a of the two jigs 81 to adjust the arrangement of bores 106 to right angles. The lower members are fixed to a support member in this state by tightening up screw members 110.

4 Claims, 8 Drawing Sheets

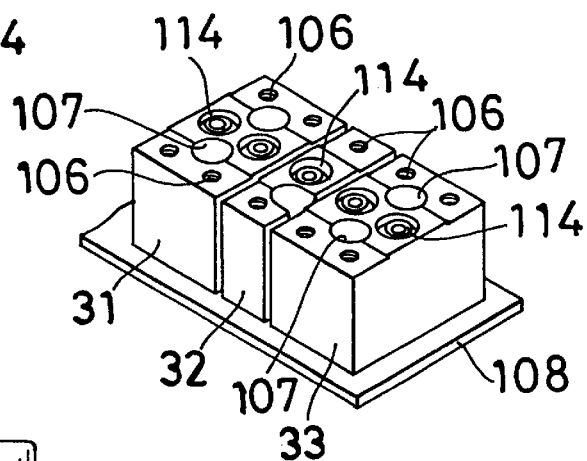
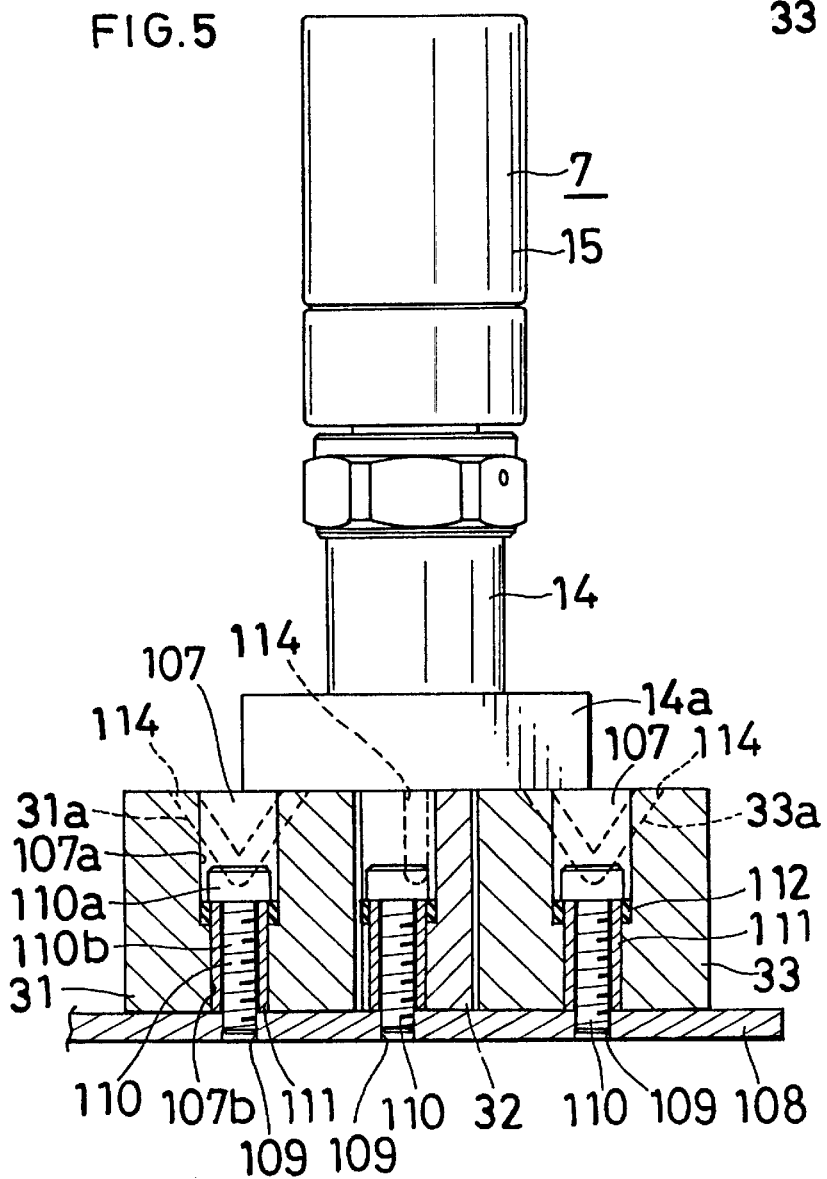

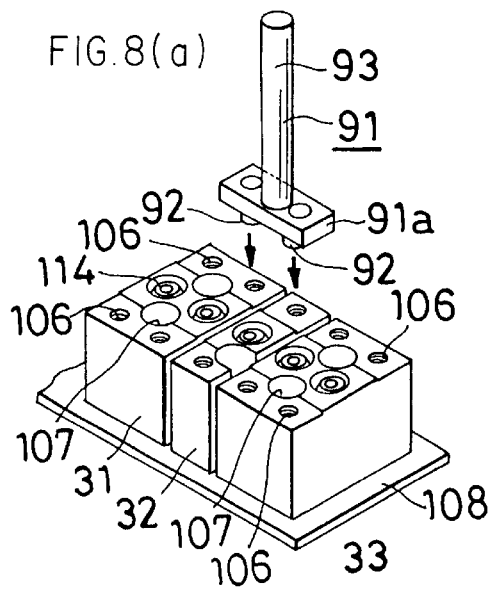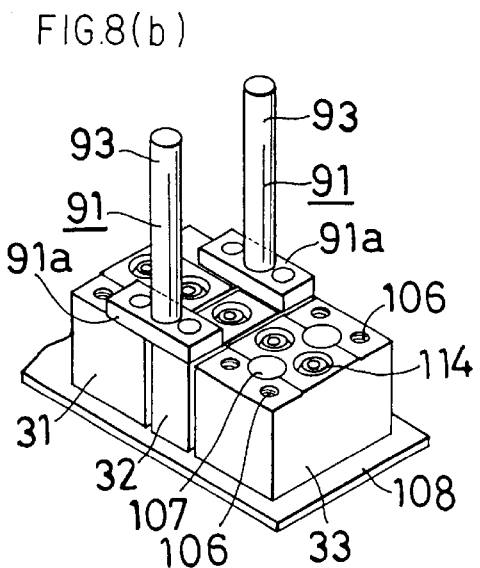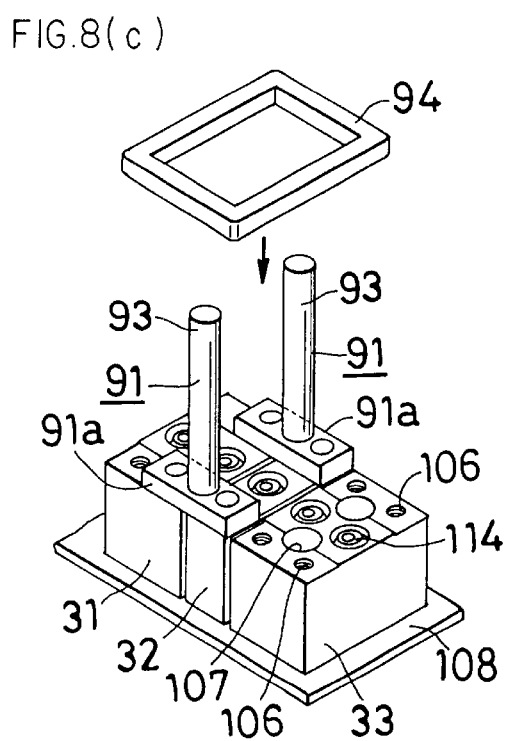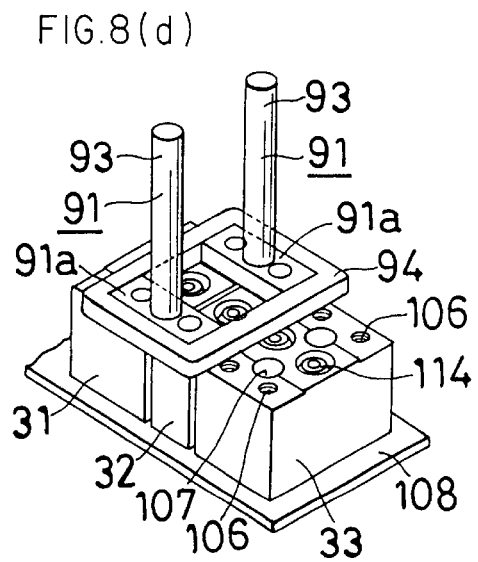

METHOD OF FIXING A PLURALITY OF LOWER MEMBERS EACH HAVING REFERENCE BORE FOR INSTALLING UPPER MEMBER, AND FIXING JIGS

This application is a division of prior application Ser. No. 09/168,859, filed Oct. 9, 1998, now issued as U.S. Pat. No. 6,199,260.

BACKGROUND OF THE INVENTION

The present invention relates to lower member fixing methods useful for fixing to a support member a plurality of lower members each having at least one reference ore for installing an upper member.

The terms "upper member" and "lower member" as used wherein refer respectively to a member away from the support member and a member closer to the support member.

For example, fluid control apparatus for use in semiconductor manufacturing equipment are assembled by fixing a plurality of couplings (lower members) to a base plate (support member) and fixing a functional member (upper member) such as an on-off valve or massflow controller, as positioned on these couplings, to the couplings.

For use in assembling the fluid control apparatus, the base plate is formed with threaded bores, the couplings are each formed with insertion holes for inserting therethrough coupling fixing bolts to be screwed into threaded bores of the base plate and with threaded bores for functional member attaching bolts, and the functional member is formed with insertion holes for the functional member attaching bolts. When the couplings are fixed to the base plate by the coupling member fixing bolts, the functional member attaching bolts can be readily screwed into the respective threaded bores of the couplings, with the joints between the functional member and the couplings sealed off.

However, since play is provided inside the bolt insertion hole of the coupling around the coupling fixing bolt, the interval between the threaded bores of adjacent couplings is likely to vary by an amount corresponding to the play. The conventional method therefore has the problem that the bolt insertion holes of the functional member are not always in register with the corresponding threaded bores of the couplings in installing the functional member on the couplings, presenting difficulty in attaching the functional member to the couplings.

Furthermore, the fluid channel of the coupling will not be in alignment with the corresponding fluid channel of the functional member as specified, entailing the problem of impaired sealing.

SUMMARY OF THE INVENTION

An object of the present invention is to provide a lower member fixing method permitting an upper member to be reliably attached to lower members fluid-tightly in the case where each of the lower members and the upper member has a fluid channel, such that a valve or the like (upper member)-can be readily attached to couplings (lower members) as fixed.

In fixing a plurality of lower members to a support member by screw members, each of the lower members being formed in an upper surface thereof with at least one bore serving as a reference for attaching an upper member, the present invention according to claim 1 provides a lower member fixing method for use in fixing at least two lower members among the plurality of lower members so that the reference bores thereof are arranged side by side as spaced apart by a predetermined interval, the method being characterized by using a spacing jig formed on a bottom surface thereof with projections arranged side by side at a spacing equal to the predetermined interval between the reference bores, and fixing the lower members by tightening up screw members with the projections of the spacing jig fitted in the respective reference bores of the lower members.

In fixing a plurality of lower members to a support member by screw members, each of the lower members being formed in an upper surface thereof with at least one bore serving as a reference for attaching an upper member, the invention according to claim 2 provides a lower member fixing method for use in fixing unfixed one of the lower members to the support member having fixed thereto a specified number of lower members so that the reference bores of the unfixed lower member and the fixed lower member adjacent thereto are arranged side by side as spaced apart by a predetermined interval, the method being characterized by using a spacing jig formed on a bottom surface thereof with projections arranged side by side at a spacing equal to the predetermined interval between the reference bores, and fixing the unfixed lower member by tightening up screw members with the projections of the spacing jig fitted in the respective reference bores of the unfixed lower member and the fixed lower member adjacent thereto.

According to the invention as defined in claims 1 and 2, the reference bore is, for example, an upper member fixing threaded bore formed in the lower member and corresponding to a bolt insertion hole formed in the upper member. In the case where the lower member and the upper member have respective fluid channels to be held in communication with each other, the reference bore may be an opening of the fluid channel.

The reference bores of the lower members are spaced at the predetermined interval by the fixing method of the invention according to claims 1 and 2, so that in attaching the upper member, the corresponding bores of the upper member and the lower member, such as a bolt insertion hole of the upper member and a threaded bore of the lower member, can be reliably held in register, consequently facilitating installation of the upper member on the lower members as fixed in position. Further in the case where the lower member and the upper member each have a fluid channel, the fluid channel of the lower member can be aligned with the fluid channel of the upper member as specified, consequently ensuring sealing.

For example in the case where there are four lower members, it is possible to fix three lower members by the method of the invention as defined in claim 1 and to fix the remaining lower member by the method of the invention according to claim 2, or to fix two lower members by the method of the invention as defined in claim 1, to fix the third lower member by the method of the invention according to claim 2 and to fix the fourth lower member also by the method of the invention according to claim 2.

In fixing a plurality of lower members to a support member by screw members, each of the lower members being formed in each of front and rear portions of an upper surface thereof with at least one bore serving as a reference for attaching an upper member, the invention according to claim 3 provides a lower member fixing method for use in fixing at least two lower members among the plurality of lower members so that the reference bores thereof are arranged side by side as spaced apart by a predetermined interval, the method being characterized by using two spacing jigs formed on a bottom surface thereof with projections arranged side by side at a spacing equal to the predetermined interval between the reference bores, and fixing the lower members by tightening up screw members, with the projections of the first of the spacing jigs fitted in the respective front reference bores of the lower members and with the projections of the second of the spacing jigs fitted in the respective rear reference bores of the lower members.

In fixing a plurality of lower members to a support member by screw members, each of the lower members being formed in each of front and rear portions of an upper surface thereof with at least one bore serving as a reference for attaching an upper member, the invention according to claim 4 provides a lower member fixing method for use in fixing unfixed one of the lower members to the support member having fixed thereto a specified number of lower members so that the reference bores of the unfixed lower member and the fixed lower member adjacent thereto are arranged side by side as spaced apart by a predetermined interval, the method being characterized by fixing the unfixed lower member by tightening up the screw members therefor, with projections of a first spacing jig fitted in the respective front reference bores of the unfixed lower member and the fixed lower member adjacent thereto and with projections of a second spacing jig fitted in the respective rear reference bores of the unfixed and fixed lower members.

According to the invention as defined in claims 3 and 4, the reference bore is preferably an upper member fixing threaded bore formed in the lower member and corresponding to a bolt insertion hole formed in the upper member.

The reference bores of the lower members are spaced at the predetermined interval by the two spacing jigs according to the fixing method of the invention as defined in claims 3 and 4, so that the corresponding bores of the upper member and the lower member, such as a bolt insertion hole of the upper member and a threaded bore of the lower member, can be reliably held in register, consequently facilitating installation of the upper member on the lower members as fixed in position.

Further in the case where the lower member and the upper member each have a fluid channel, the fluid channel of the lower member can be aligned with the fluid channel of the upper member as specified, consequently ensuring sealing.

For example in the case where there are four lower members, it is possible to fix three lower members by the method of the invention as defined in claim 3 and to fix the remaining lower member by the method of the invention according to claim 4, or to fix two lower members by the method of the invention as defined in claim 3, to fix the third lower member by the method of the invention according to claim 4 and to fix the fourth lower member also by the method of the invention according to claim 4.

According to the invention as defined in claim 5, the fixing method is characterized in that with the projections of the first and second spacing jigs fitted in the respective reference bores of the lower members, adjustment is made to position lines through the projections of the respective first and second spacing jigs at right angles with a line through the pair of front and rear corresponding projections of the two spacing jigs. In the case where at least one bore serving as a reference in installing the upper member is formed in each of the front and rear portions of the upper surface of each lower member, that is, when reference bores are formed in two adjacent lower members so as to be positioned at the respective corners of a rectangle or square, the present method not only adjusts the interval between the reference bores but also adjusts the bores to an arrangement having right angles, consequently assuring that the reference bores in the adjacent lower members are positioned at the respective corners of a rectangle or square (not of a parallelogram). This greatly facilitates installation of the upper member on the lower members as fixed in position, ensuring more effective sealing.

According to the invention as defined in claim 5, it is desired that each of the spacing jigs comprise an approximately rectangular parallelepipedal body, and that the adjustment be made by fitting a right angle holding jig around the bodies of the two spacing jigs, the right angle holding jig being in the form of a rectangular frame and having inner side faces positionable respectively in contact with a front side face of the first spacing jig, a rear side face of the second spacing jig, and left and right side faces of the two spacing jigs. The body of each spacing jig and the right angle holding jig can be modified variously in shape, whereas if the spacing jig has an approximately rectangular parallelepipedal body, with the right angle holding jig made in the form of a rectangular frame, the adjustment can be made with greater ease and reliably.

With the method as defined in any one of claims 1 to 5, it is desired that each screw member be screwed into the corresponding threaded bore of the support member about one turn to temporarily hold each lower member to the support member to an extent not to permit removal thereof, before the projections of the spacing jig are fitted in the reference bores of the lower members. The spacing jig projections are then fittable in the reference bores of the lower members easily.

The invention as defined in claim 7 provides a spacing jig for use in a method according to any one of claims 1 to 5 which jig is formed on a bottom face thereof with the projections arranged side by side at a spacing equal to the predetermined interval between the reference bores of the lower members.

Preferably, the body of the spacing jig is in the form of a plate or rectangular parallelepiped. To render the jig easy to use, the body preferably has a rodlike handle.

According to the invention as defined in claim 8, there is provided a right angle holding jig for use in a method according to claim 6 which jig is in the form of a rectangular frame and having inner side faces positionable respectively in contact with the front side face of the first spacing jig, the rear side face of the second spacing jig, and the left and right side faces of the two spacing jigs.

BRIEF DESCRIPTION OF THE DRAWINGS

FIG. 4 is a perspective view showing couplings (lower members) included in the apparatus;

FIG. 5 is a front view showing the couplings (lower members) and an on-off valve (upper member);

FIGS. 8(a)–8(d) includes perspective views showing another example of procedure for fixing the lower members according to the invention as defined in claim 2;

DESCRIPTION OF THE PREFERRED EMBODIMENTS

Figure 1:
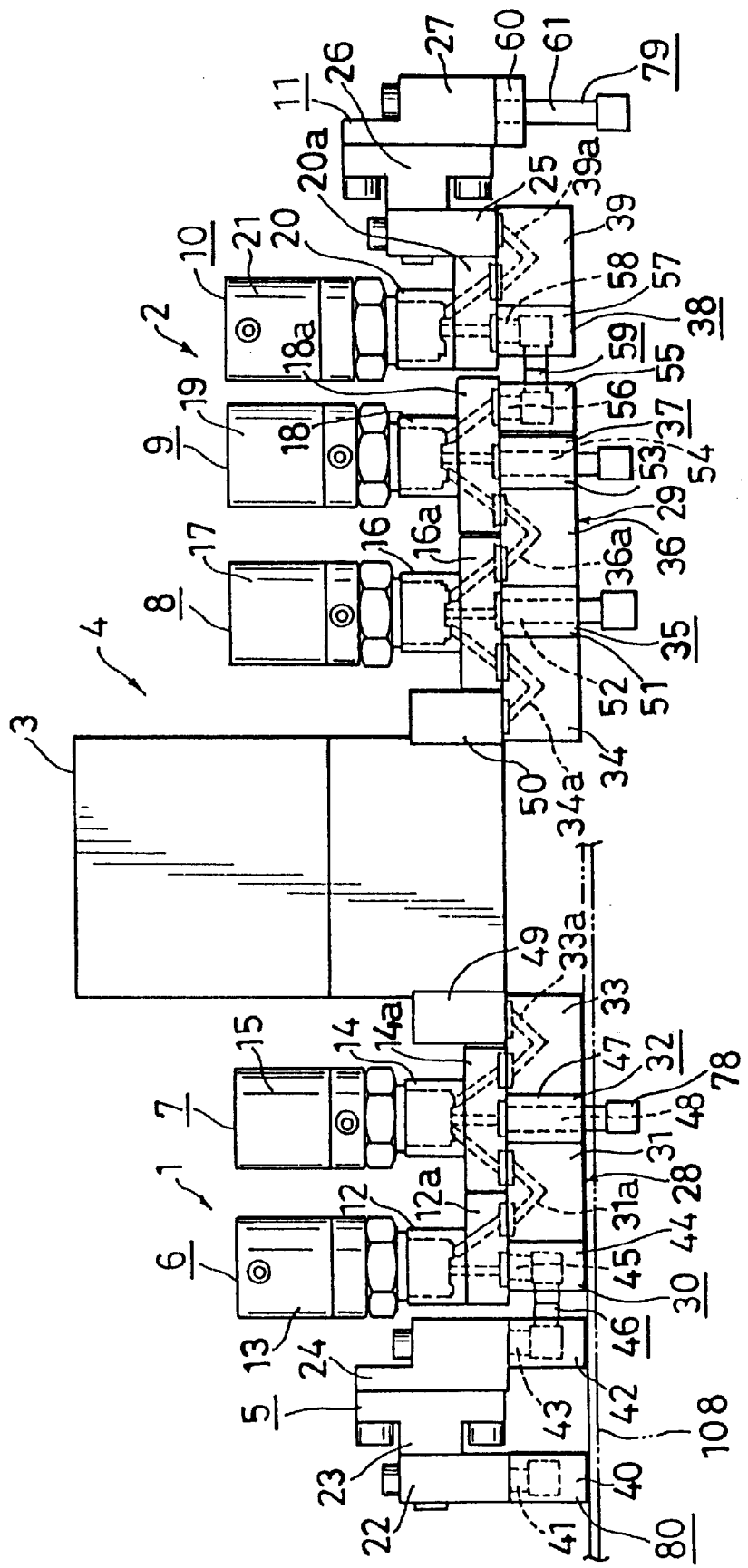
FIG. 1 is a front view showing a fluid control apparatus which is to be assembled by a lower member fixing method of the invention.

Embodiments of the present invention will be described below with reference to the drawings. In the following description, the terms "left" and "right" refer respectively to the left- and right-hand sides of FIG. 1, and the front side of the plane of the drawing will be referred to as "front," and the rear side thereof as "rear."

Figure 2:
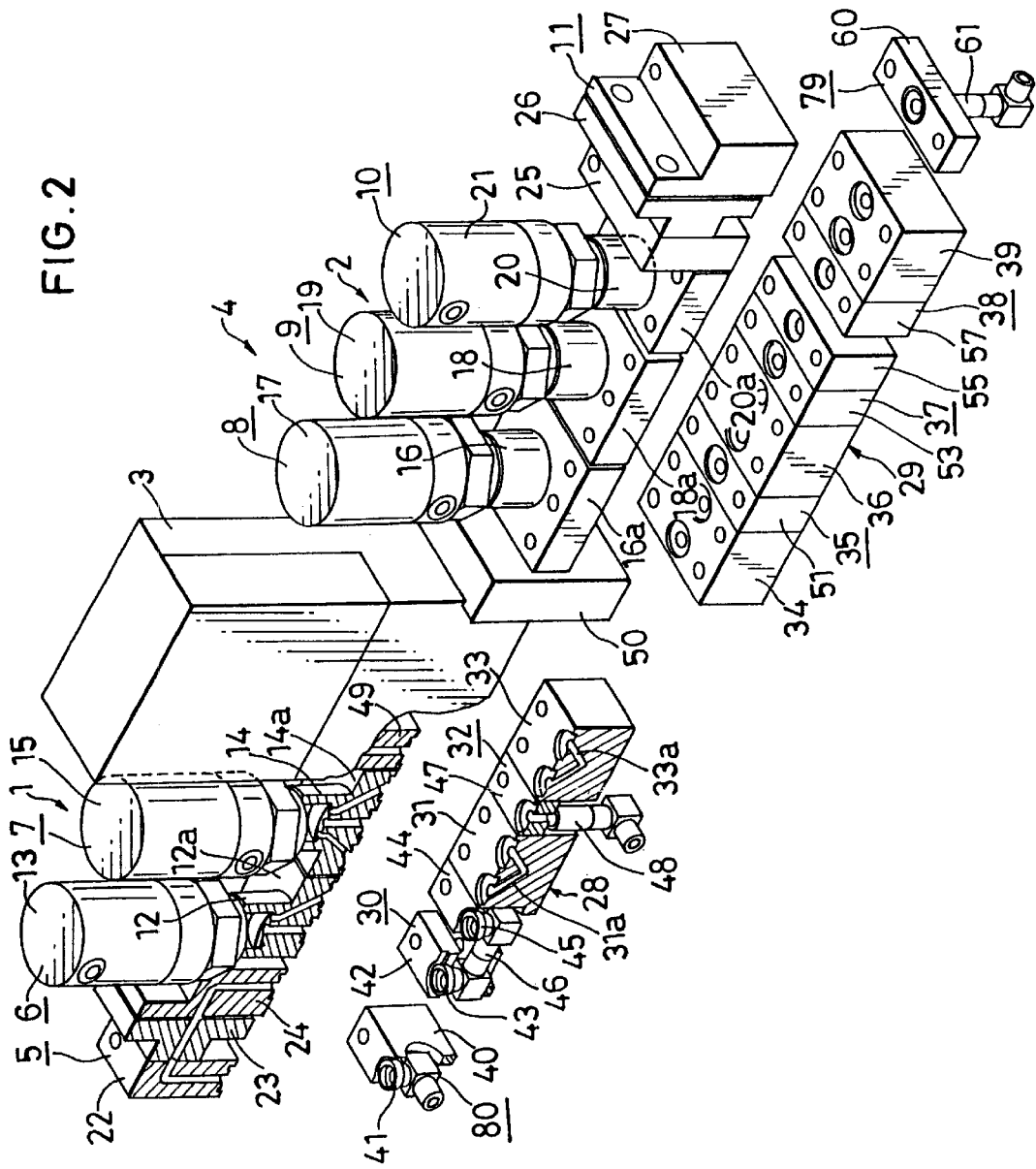
FIG. 2 is an exploded perspective view partly in section and showing the same.
Figure 3:
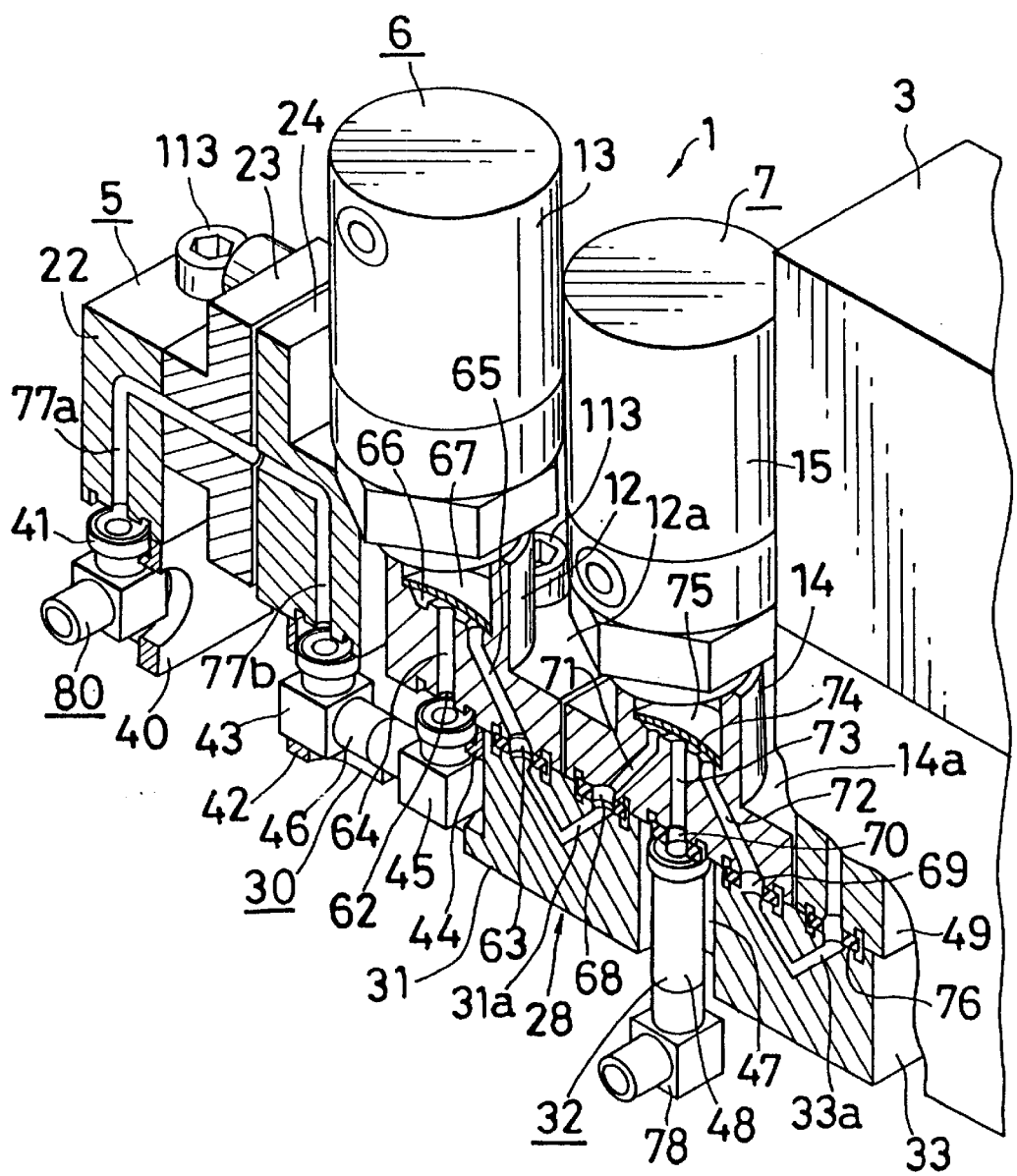
FIG. 3 is an enlarged perspective view partly in section and showing a shutoff-opening device constituting the fluid control apparatus.
Figure 6A:
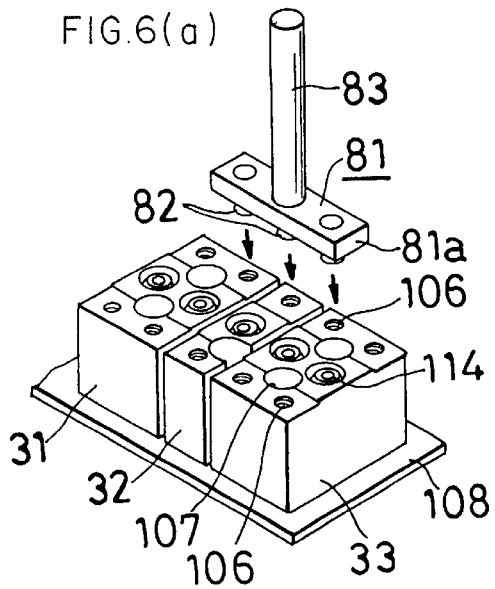
FIGS. 6(a)–6(d) includes perspective views showing an exemplary procedure for fixing the lower members according to the invention as defined in claim 2.
Figure 6B:
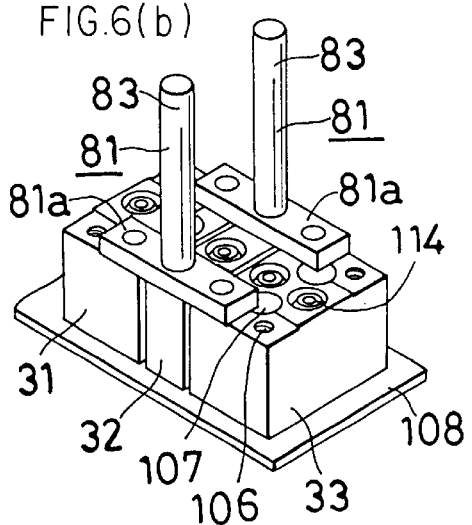
Figure 6C:
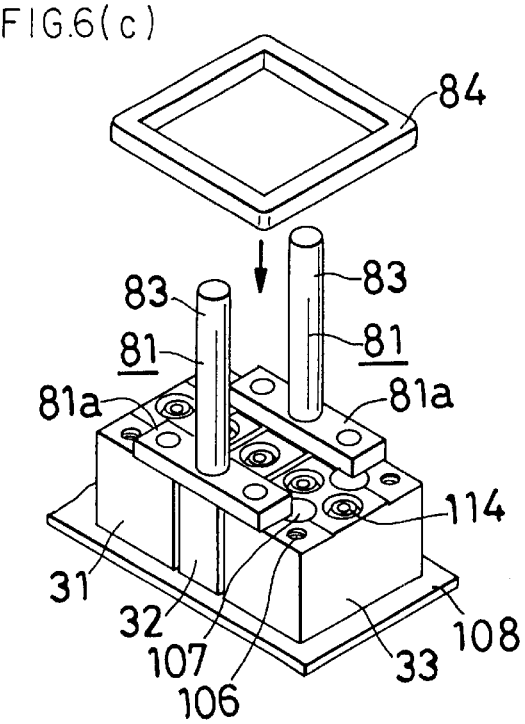
Figure 6D:
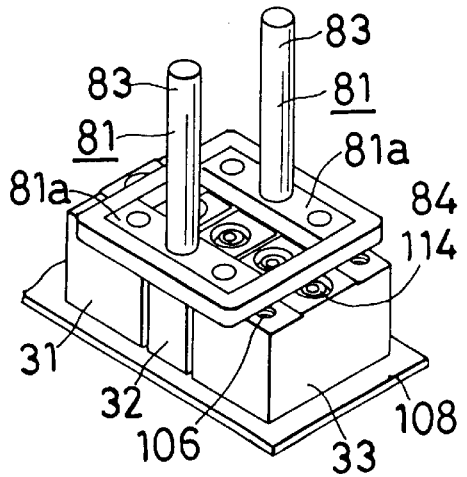

FIGS. 1 to 3 show a fluid control apparatus which is assembled using the method of fixing lower members according to the invention. The fluid control apparatus 4 is adapted for use in semiconductor manufacturing equipment or the like and comprises a massflow controller 3, and shutoff-opening devices 1, 2 at the left and right of the controller 3.

The shutoff-opening device 1 at left comprises a first on-off valve 6 at left, a second on-off valve 7 at right and a first valve mount 28 having the two valves 6, 7 mounted thereon. The first valve mount 28 comprises a plurality of couplings 30, 31, 32, 33 as will be described later. Disposed at the left of the left shutoff-opening device 1 is a first check valve 5.

The shutoff-opening device 2 at right comprises a third on-off valve 8 disposed at left, a fourth on-off valve 9 disposed at an intermediate position, a fifth on-off valve 10 disposed at right and a second valve mount 29 having these valve 8, 9, 10 mounted thereon. The second valve mount 29 comprises a plurality of couplings 34, 35, 36, 37, 38, 39 as will be described later. Disposed at the right of the right shutoff-opening device 2 is a second check valve 11.

The on-off valves 6, 7, 8, 9, 10 comprise respective main bodies 12, 14, 16, 18, 20 and respective actuators 13, 15, 17, 19, 21 mounted thereon from above for suitably opening and closing a channel through each valve main body. The main bodies 12, 14, 16, 18, 20 of the on-off valves 6 to 10 are provided at their lower ends with flanges 12a, 14a, 16a, 18a, 20a, respectively, which are rectangular when seen from above.

Each of the check valves 5, 11 comprises a left main body 22 (25) having an inlet in its bottom face, a middle main body 23 (26) screwed to the main body 22 (25) and a right main body 24 (27) having an outlet in its bottom face and fastened with screws to the middle main body 23 (26).

The massflow controller 3 is formed on the left side of its lower end with a rectangular parallelepipedal leftward extension 49 having an inlet in its bottom face, and on the right side of its lower end with a rectangular parallelepipedal rightward extension 50 having an outlet in its bottom face.

The bottom faces of the valve main bodies 22, 23, 24, 12, 14 at the left of the massflow controller 3 and the bottom face of the leftward extension 49 of the controller 3 are all flush with one another. The rightward extension 50 of the controller 3 and the valve main bodies 16, 18, 20, 25, 26, 27 have their bottom faces positioned all flush with one another.

As shown on an enlarged scale in FIG. 3, the first check valve 5 has an inflow channel 77a and an outflow channel 77b which are opened downward. The first on-off valve 6 is a two-port valve. The main body 12 of the valve 6 is formed in its bottom face with an inlet 62 positioned approximately centrally thereof, and an outlet 63 positioned at right. The valve main body 12 is internally formed with an inflow channel 64 extending from the inlet 62 to a valve chamber 66, and an outflow channel 65 extending from the outlet 63 to the chamber 66. The actuator 13 of the first on-off valve 6 serves to operate a valve element 67 in the form of a diaphragm. When operated, the actuator 13 opens or closes the inflow channel 64 with the valve element 67. The second on-off valve 7 is a three-port valve. The main body 14 of the valve 7 is formed in its bottom face with an inlet 68 at left, an outlet 69 at right and an inlet-outlet subopening 70 positioned approximately in the center to serve as an inlet or outlet for other fluid. The valve main body 14 is internally formed with an inflow channel 71 extending from the inlet 68 to a valve chamber 74, a subchannel 73 extending from the subopening 70 to the chamber 74 and an outflow channel 72 extending from the outlet 69 to the chamber 74. The actuator 15 of the second on-off valve 7 serves to operate a valve element 75 in the form of a diaphragm. When operated, the actuator 15 opens or closes the subchannel 73 with the valve element 75. The inflow channel 71 extending to the inlet 68 of the second on-off valve 7 is always in communication with the outflow channel 72 extending to the outlet 69 through the valve chamber 74.

The inlet of left main body 22 of the first check valve 5 is provided with a purge gas supply coupling 80 connected to a purge gas supply line and comprising a rectangular parallelepipedal block 40 and an L-shaped channel member 41 held by the member 40.

The outlet of right main body 24 of the first check valve 5 is held in communication with an inlet of main body 12 of the first on-off valve 6 by a first inflow channel coupling 30 for introducing a fluid into the left shutoff-opening device 1. The coupling 30 comprises two rectangular parallelepipedal blocks 42, 44 and a U-shaped communication channel member 46 held by these blocks 42, 44 and comprising two L-shaped channel members 43, 45 which are joined to each other.

Opposed to both the bottom face of rightward portion of main body 12 of the first on-off valve 6 and the bottom face of leftward portion of main body 14 of the second on-off valve 7 is a rectangular parallelepipedal first communication channel block coupling 31 having a V-shaped channel 31a for causing the outlet of the valve 6 to communicate with the inlet of the valve 7.

The main body 14 of the second on-off valve 7 is provided at its inlet-outlet subopening with a first subchannel coupling 32 comprising a rectangular parallelepipedal block 47 and an I-shaped channel member 48 and held by the block 47. Attached to the lower end of the coupling 32 is a known L-shaped coupling 78 connected to a process gas supply line.

Disposed beneath both the rightward portion of main body 14 of the valve 7 and the leftward extension 49 of the massflow controller 3 is a rectangular parallelepipedal first outflow channel block coupling 33 having a V-shaped channel 33a for sending a fluid from the outlet of the valve 7 to the controller 3.

Disposed beneath both the bottom face of rightward extension 50 of the massflow controller 3 and the bottom face of leftward portion of main body 16 of the third on-off valve 8 is a rectangular parallelepipedal second inflow channel block coupling 34 having a V-shaped channel 34a for introducing a fluid from the controller 3 into the right shutoff-opening device 2.

The main body 16 of the third on-off valve 8 has an inlet-outlet subopening, which is provided with a second subchannel coupling 35 connected to an evacuating line and comprising a rectangular parallelepipedal block 51 and an L-shaped channel member 52 and held by the block 51.

Disposed beneath both the bottom face of rightward portion of main body 16 of the third on-off valve 8 and the bottom face of leftward portion of main body 18 of the fourth on-off valve 9 is a rectangular parallelepipedal second communication channel block coupling 36 having a V-shaped channel 36a for causing an outlet of the valve 8 to communicate with an inlet of the valve 9.

The main body 18 of the fourth on-off valve 9 has an inlet-outlet subopening, which is provided with a third subchannel coupling 37 connected to a process gas supply line and comprising a rectangular parallelepipedal block 53 and an L-shaped channel member 54 and held by the block 53.

An outlet of main body 18 of the fourth on-off valve 9 is held in communication with an inlet of main body 20 of the fifth on-off valve 10 by a third communication channel coupling 38, which comprises two rectangular parallelepipedal blocks 55, 57 and a U-shaped communication channel member 59 held by these blocks. The member 59 comprises two L-shaped channel members 56, 58 joined to each other.

Disposed beneath both the bottom face of rightward portion of main body 20 of the fifth on-off valve 10 and the bottom face of left main body 25 of the second check valve 11 is a rectangular parallelepipedal second outflow channel block coupling 39 having a V-shaped channel 39a for causing an outlet of the valve 10 to communicate with the inlet of the valve 11.

The outlet of right main body 27 of the second check valve 11 is provided with a purge gas discharge coupling 79 connected to a purge gas discharge line and comprising a rectangular parallelepipedal block 60 and an L-shaped channel member 61 held by the block 60.

The first inflow channel coupling 30, first communication channel coupling 31, first subchannel coupling 32 and first outflow channel coupling 33 which are positioned at the left side of the controller 3 form the first valve mount 28 of the left shutoff-opening device 1. The second inflow channel coupling 34, second subchannel coupling 35, second communication channel coupling 36, third subchannel coupling 37, third communication channel coupling 38 and second outflow channel coupling 39 which are positioned at the right side of the controller 3 provide the valve mount 29 of the right shutoff-opening device 2.

Thus, the left shutoff-opening device 1 has a purge gas channel through which a purge gas admitted through the check valve 5 is discharged to the massflow controller 3 via the first inflow channel coupling 30, the main body 12 of the first on-off valve 6, the first communication channel coupling 31, the main body 14 of the second on-off valve 7 and the first outflow channel coupling 33; and a process gas channel through which a process gas admitted from the bottom face of the first subchannel coupling 32 is discharged via the coupling 32, the main body 14 of the second on-off valve 7 and the first outflow channel coupling 33. The right shutoff-opening device 2 has a purge gas channel through which the purge gas introduced via the controller 3 is discharged by way of the second inflow channel coupling 34, second communication channel coupling 36, third communication channel coupling 38 and second outflow channel coupling 39; a process gas channel through which the process gas admitted through the controller 3 is fed to a process chamber via the second inflow channel coupling 34, second communication channel coupling 36 and third subchannel coupling 37; and an evacuating channel for drawing off the gas from these purge gas and process gas channels via the second subchannel coupling 35.

A seal 76 as shown in FIG. 3 is provided between each of the valve main bodies 22, 23, 24, 12, 14, 16, 18, 20, 25, 26, 27 and at least one of the couplings 80, 30, 31, 32, 33, 34, 35, 36, 37, 38, 39, 79 joined to the valve main body in butting contact. The check valves 5, 11 and the on-off valves 6, 7, 8, 9, 10 are each fastened to at least one of the couplings 80, 30, 31, 32, 33, 34, 35, 36, 37, 38, 39, 79 opposed thereto with bolts 113 screwed into the main body 22, 23, 24, 12, 14, 16, 18, 20, 25, 26 or 27 from above (see FIG. 3). The check valves 5, 11 and the on-off valves 6 to 10 can be removed upward by removing these bolts 113. In construction, the second check valve 11 is identical with the first check valve 5, the fifth on-off valve 10 with the first on-off valve 6, and the third and fourth on-off valves 8, 9 with the second on-off valve 7.

With the fluid control apparatus 4 having the foregoing construction, the process gas is admitted into the first subchannel coupling 32 of the left shutoff-opening device 1, with the first on-off valve 6 closed, the second on-off valve 7 held open, the third on-off valve 8 closed, the fourth on-off valve 9 held open and the fifth on-off valve 10 closed, whereupon the process gas flows through the main body 14 of the second on-off valve 7 and the first outflow channel coupling 33 into the massflow controller 3, wherein the gas has its flow rate regulated. The gas is then admitted into the right shutoff-opening device 2, thereafter flows through the second inflow channel coupling 34, the main body 16 of the third on-off valve 8, the second communication channel coupling 36, the main body 18 of the fourth on-off valve 9 and the third subchannel coupling 37 and is sent into the process chamber. When the purge gas is thereafter admitted into the first check valve 5, with the first on-off valve 6 held open, the second on-off valve 7 closed, the third on-off valve 8 closed, the fourth on-off valve 9 closed and the fifth on-off valve 10 held open, the purge gas flows through the first inflow channel coupling 30, the main body 12 of the first on-off valve 6, the first communication channel coupling 31, the main body 14 of the second on-off valve 7 and the first outflow channel coupling 33, reaches the massflow controller 3, further flows through the second inflow channel coupling 34, the main body 16 of the third on-off valve 8, the second communication channel coupling 36, the main body 18 of the fourth on-off valve 9, the third communication channel coupling 38, the main body 20 of the fifth on-off valve 10, second outflow channel coupling 39 and the second check valve 11, and is discharged. At this time, the purge gas drives out with its own pressure the process gas remaining in the main body 14 of the second on-off valve 7, first outflow channel coupling 33, second inflow channel coupling 34 and second communication channel coupling 36, with the result that purge gas only flows through the apparatus in a short period of time.

With the shutoff-opening devices 1, 2, the first inflow channel coupling 30 and the third communication channel coupling 38 are common members, the first communication channel coupling 31, first outflow channel coupling 33, second inflow channel coupling 34, second communication channel coupling 36 and second outflow channel coupling 39 are common members, and subchannel couplings 32, 35, 37 are also common members. In other words, the right shutoff-opening device 2 is available only by adding one three-port on-off valve to the left shutoff-opening device 1 and adding to the valve mount 28 thereof the same members as the first communication channel coupling 31 and the first subchannel coupling 32. When the on-off valve to be added is a two-port valve, the fourth on-off valve 9 of the right shutoff-opening device 2 is replaced by a two-port valve, with the third subchannel coupling 37 removed from the mount 29. Thus, the left and right shutoff-opening devices 1 and 2 are amenable to various modifications.

With the embodiment shown in FIG. 1, the left shutoff-opening device 1 has two on-off valves 6, 7, while the right shutoff-opening device 2 has three on-off valves 8, 9, 10, whereas the number of on-off valves is variable suitably. Two shutoff-opening devices each having a suitable number of on-off valves are arranged respectively at the left and right sides of a massflow controller, and such arrangements are further arranged in parallel to provide a fluid control apparatus for use in semiconductor manufacturing equipment.

The fluid control apparatus is installed by mounting the couplings 80, 30, 31, 32, 33, 34, 35, 36, 37, 38, 39, 79 on a base plate 108 with coupling fixing bolts 110, attaching fluid controllers, such as check valves 5, 11, on-off valves 6, 7, 8, 9, 10 and massflow controller 3, to the couplings 80, 30 to 39, 79 with fixing bolts 113 so as to connect these couplings, and fixing the base plate 108 in position.

The fluid control apparatus are assembled by the procedures to be described below with reference to FIGS. 4 to 12.

FIG. 4 shows the two block couplings 31, 33 and the subchannel coupling 32 interposed therebetween. With reference to the drawing, each of the block couplings 31, 33 is formed in its upper surface with two channel openings 114 at opposite ends of the V-shaped channel 31a (33a) which are arranged side by side, and with a pair of threaded bores 106 at the respective front and rear sides of each channel opening 114 for attaching the on-off valve 7. Each of the block couplings 31, 33 is further formed with two bolt insertion holes 107 for passing therethrough bolts for fixing the block coupling 31 (33) to the base plate 108. The insertion holes 107 are provided respectively at a position surrounded by the channel openings 114 and the front threaded bores 106, and at a position surrounded by the channel openings 114 and the rear threaded bores 106. The subchannel coupling 32 is formed in its upper surface with the opening 114 of a subchannel, and a pair of threaded bores 106 at the respective front and rear sides of the channel opening 114 for attaching the valve 7. The coupling 32 further has a bolt insertion hole 107 for inserting therethrough the bolt 110 for fixing the coupling 32 to the base plate 108. The insertion hole 107 is singly formed between the channel opening 114 and the front threaded bore 106. The front threaded bores 106 of the couplings 31, 32, 33 are aligned along the left-to-right direction. This is also true of each group of the other holes, openings and bores, i.e., the front insertion holes 107, openings 114, rear insertion holes 107 and rear threaded bores 106. In each pair of immediately adjacent couplings 31, 32, 33, threaded bores 106 are arranged at the respective corners of a rectangle. A small clearance is formed between the couplings 31, 32, 33 so that the couplings are movable when to be installed.

As shown in FIG. 5, the couplings 31, 32, 33 are fastened to the base plate 108 which are formed with threaded bores 109 with coupling fixing bolts 110, and the on-off valve 7 is thereafter attached to the couplings 31, 32, 33 so as to connect the couplings together.

With reference to FIG. 5, the bolt insertion hole 107 of each of the couplings 31 to 33 comprises a large-diameter portion 107a having a greater diameter than the head 110a of the coupling fixing bolt 110, and a small-diameter portion 107b having a diameter intermediate between the diameter of the-bolt head 110a and the diameter of the shank 10b of the bolt. Fitted in the small-diameter portion 107b of the insertion hole 107 is a cylindrical spacer 111 having an upper end positioned in the large-diameter portion 107a and a lower end bearing on the base plate 108. The spacer 111 has an inside diameter larger than the diameter of the bolt shank 110b and an outside diameter smaller than the diameter of the bolt head 110a. The bolt shank 110b is fitted in the spacer 111, and the bolt head 110a bears on the upper end face of the spacer 111. The spacer 111 determines the amount of tightening of the bolt 110. As the bolt 110 inserted through the insertion hole 107 is screwed into the threaded bore 109 of the base plate 108, the spacer 111 bearing on the base plate 108 props the head 110a, preventing further tightening. Fitted around the upper end of the spacer 111 is an annular rubber washer 112 having an outside diameter approximately equal to the diameter of the bolt head 110a. The rubber washer 112 is held between the bolt head 110a and the stepped portion 107c of the insertion hole 107. The vertical length of the rubber washer 112 is so determined that the washer 112 is subjected to a compressive force when the bolt 110 is tightened up as shown in FIG. 5. Accordingly, the couplings 31, 32, 33 are biased toward the base plate 108 by the rubber washers 112 used. The rubber washers 112 have elasticity and can therefore be further deformed by compression, rendering the couplings 31, 32, 33 movable away from the base plate 108. Consequently, as the onoff valve 7 is fastened to the couplings 31, 32, 33 by the bolts 110 even if the couplings 31 to 33 are not flush with one anther at their upper surfaces, the couplings 31 to 33 are brought close to the valve 7. This renders the bolts 110 easy to tighten up, whereby all the seals 76 can be subjected to a proper pressure to assure sealing.

To make the coupling fixing bolt 110 readily fittable in the threaded bore 109 of the base plate 108, play is provided between the bolt 110 and the spacer 111. When the play is, for example, 0.5 mm, the spacing between the two of the couplings 31, 32, 33 differs by 1 mm when they are positioned closest and when they are remotest. When the valve 7 is positioned over and attached to the couplings 31 to 33, this difference entails the likelihood that the channel openings of the valve 7 will not be aligned with the corresponding channel openings of the couplings 31 to 33 to result in impaired sealing.

A description will be given of a method of fixing couplings (lower members) without producing such a difference by using spacing jigs 81, 91, 121 and right angle holding jigs 84, 94.

With reference to FIG. 6, the spacing jig 81 has a rectangular parallelepipedal body 81a formed on its bottom surface with three projections 82 arranged side by side, and a handle 83 in the form of a rod and provided on the upper surface of the body 81a. The projections 82 are fittable respectively to the right threaded bore 106 of the left block coupling 31, the threaded bore 106 of the subchannel coupling 32 and the left threaded bore 106 of the right block coupling 33, and are arranged at a spacing equal to a predetermined interval between the bores 106 of the adjacent couplings 31, 32, 33. The right angle holding jig 84 is in the form of a square frame having an inside measurement equal to the left-to-right length of the body 81a of the spacing jig 81. The inside measurement is equal to the interval between the front and rear threaded bores 106 plus the front-to-rear length of the body 81a of the spacing jig 81. The right angle holding jig 84 is internally so contoured as to accommodate therein the bodies 81a of two spacing jigs 81 having their projections 32 fitted to the corresponding threaded bores 106.

Figure 7:
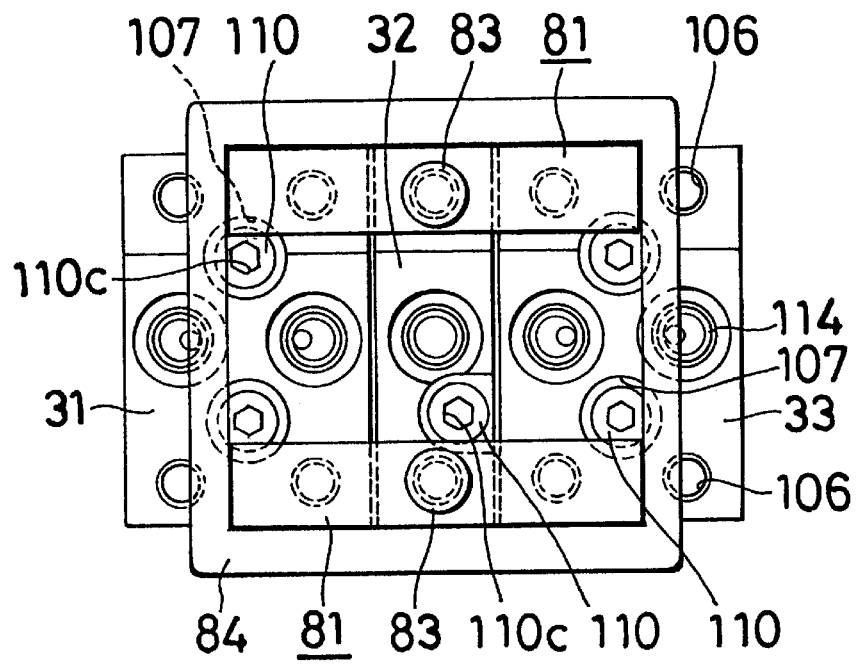
FIG. 7 is a plan view showing the final step of the procedure.
Figure 9:
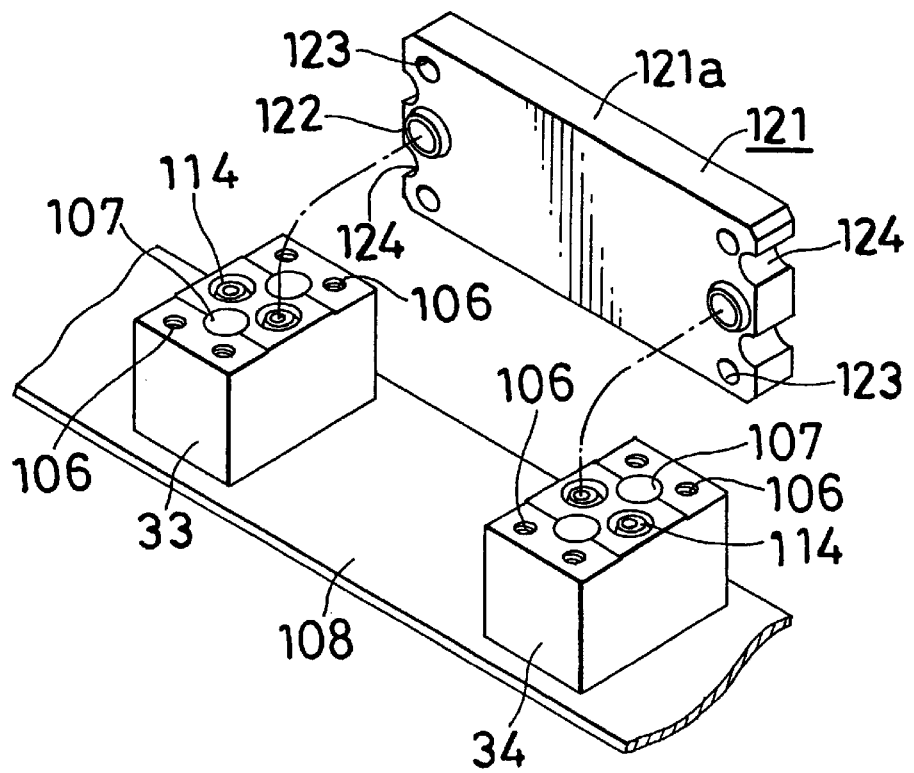
FIG. 9 is a perspective view showing a lower member fixing method according to the invention as defined in claim 1.
Figure 10:
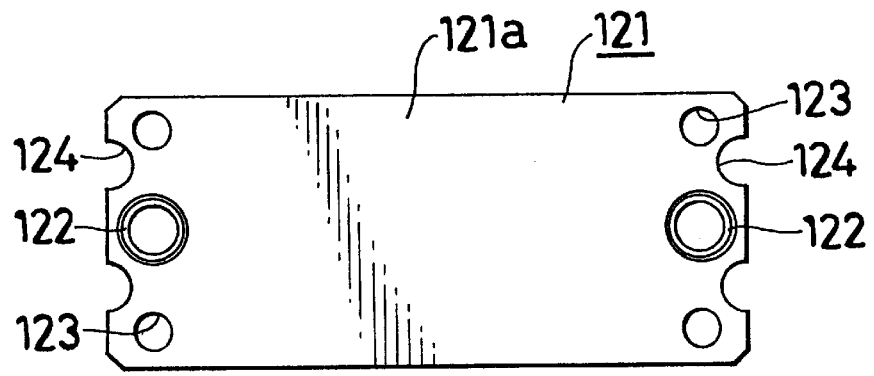
FIG. 10 is a bottom view of a s pacing jig for use in this method.
Figure 11:
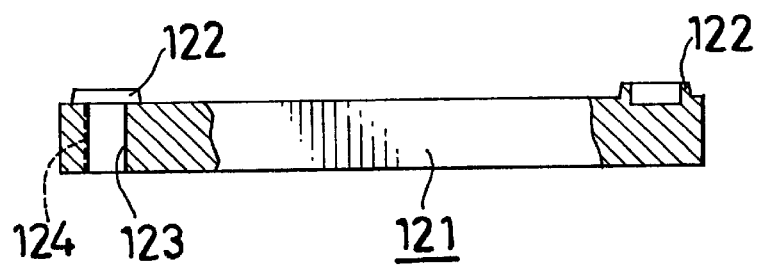
FIG. 11 is a front view partly broken away and showing the jig.

To fasten the couplings 31 to 33 to the base plate 108, the coupling fixing bolt 110 is inserted through each of the bolt insertion holes 107 of each of the couplings 31 to 33 along with the spacer 111 and rubber washer 112 and screwed slightly into the corresponding threaded bore 109 of the base plate 108 to temporarily old the coupling to the base 108 to such an extent as not to permit the removal thereof. Next, the spacing jig 81 is used to fit the projections 82 thereof to the respective rear threaded bores 106 of the couplings 31 to 33 [see FIG. 6, (a)]. Another spacing jig 81 is then used to fit the projections 82 thereof to the respective front threaded bores 106 of the couplings 31 to 33 [see FIG. 6, (b)], whereby the interval between the threaded bores 109 of the couplings 31 to 33 is made to match the predetermined value. However, if the threaded bores 109 of the couplings 31 to 33 are merely spaced apart by the predetermined interval, the couplings 31 to 33 will move forward or rearward, with the likelihood that a line through the centers of the bores 106 arranged from left rightward will not make a right angle with a line through the centers of the front and rear bores 106. To obviate this angular deviation, the right angle holding jig 84 in the form of a square frame is subsequently fitted around the bodies 81a of the two spacing jigs 81 [see FIG. 6, (c) and (d)], whereby the left and right end faces of the bodies 81a of the spacing jigs 81 are brought into contact with the respective left and right inner faces of the jig 84, permitting the line through the centers of the bores 106 arranged from left rightward to make a right angle with the line through the centers of the front and rear bores 106. In this state, the hexagonal socket 110c of each fixing bolt 110 is left exposed without being concealed by the spacing jig 81 and the right angle holding jig 84 as seen in FIG. 7, permitting the bolt 110 to be tightened by a wrench. Accordingly, each bolt 110 is tightened up with the wrench for full tightening. The jigs 81, 84 are removable upward. In this way, the three couplings 31 to 33 are fastened as spaced apart by the predetermined interval to the base plate 108. When the on-off valve 7 is attached to the couplings 31 to 33, the channel openings of the valve 7 are aligned with the corresponding channel openings 114 of the couplings 31 to 33 reliably as specified, thus eliminating the problem of impaired sealing.

The components can be assembled with the same advantage using the spacing jig 91 shown in FIG. 8 and having two projections 92 instead of the spacing jig 81 having three projections 82 and shown in FIGS. 6 and 7. With reference to FIG. 8, the spacing jig 91 has a rectangular parallelepipedal body 91a formed on its bottom surface with two projections 92 arranged side by side, and a handle 93 in the form of a rod and provided on the upper surface of the body 91a. The projections 92 are arranged at a spacing equal to the predetermined inverval between the bores 106 of the adjacent couplings 31, 32, 33. The jig 91 has a left-to-right length which is shorter than the jig 81 by an amount corresponding to the difference in the number of projections. Accordingly, the right angle holding jig 94 is in the form of a rectangular frame having a shorter left-to-right length.

To use these jigs 91, 94, the left block coupling 31 and the subchannel coupling 32 are first fastened to the base plate 108. The coupling fixing bolt 110 is inserted through each of the bolt insertion holes 107 of each of the couplings 31, 32 along with the spacer 111 and rubber washer 112 and screwed slightly into the corresponding threaded bore 109 of the base plate 108 to temporarily hold the coupling to the base 108 to such an extent as not to permit the removal thereof. Next, the spacing jig 91 is used to fit the projections 92 thereof to the respective rear threaded bores 106 of the couplings 31, 32 [see FIG. 8, (a)]. Another spacing jig 91 is then used to fit the projections 92 thereof to the respective front threaded bores 106 of the couplings 31, 32 [see FIG. 8, (b)]. The right angle holding jig 94 in the form of a rectangular frame is subsequently fitted around the bodies 91a of the two spacing jigs 91 [see FIG. 8, (c) and (d)], whereby the interval between the threaded bores 109 of the couplings 31, 32 is made to match the predetermined value, permitting a line through the centers of the bores 106 arranged side by side to make a right angle with a line through the centers of the front and rear bores 106. In this state, each coupling fixing bolt 110 is tightened up with the wrench for full tightening. Next, the coupling fixing bolt 110 is inserted through each of the bolt insertion holes 107 of the right block coupling 33 along with the spacer 111 and rubber washer 112 and screwed slightly into the corresponding threaded bore 109 of the base plate 108 to temporarily hold the coupling to the base 108 to such an extent as not to permit the removal thereof. The spacing jig 91 is used to fit the projections 92 thereof to the respective rear threaded bores 106 of the subchannel coupling 32 and the block coupling 33. Through the same steps as shown in FIG. 8, (a), (b), (c) and (d), the right block coupling 33 can be fastened to the base plate 108 so that the interval between the threaded bores 109 of the coupling 32, 33 is made to match the predetermined value, permitting a line through the centers of the bores 106 arranged side by side to make a right angle with a line through the centers of the front and rear bores 106. When the adjacent couplings are different in left-to-right length, namely, when the block couplings 31, 33 are to be connected to each other, or when the block couplings 31, 33 are to be connected to the subchannel coupling 32, the same jig 91 having two projections 82 and jig 94 are usable for fixing the couplings 31, 32, 33 in position.

FIGS. 9 to 12 show a method of fixing the left and right block couplings (lower members) 33, 34 spaced apart by about 100 mm and to be interconnected by the massflow controller 3. This method uses only one spacing jig 121.

The left and right block couplings 33, 34 have channel openings 114 at the opposite ends of the respective V-shaped channels 33a, 34a, threaded bores 106 for attaching the massflow controller 3 to these couplings 33, 34, and bolt insertion holes 107 for inserting therethrough coupling fixing bolts 110 for fixing the couplings 33, 34 to the base plate 108. The spacing jig 121 is in the form of a rectangular plate and is formed on the bottom surface thereof with a projection 122 fittable in the channel opening 114 of the left coupling 33 and a projection 122 fittable in the channel opening 114 of the right coupling 34. The spacing between the projections 122 is made equal to a predetermined interval between the adjacent openings 114 of the two couplings 33, 34. The jig 121 is formed at its four corners with holes 123 positionable in register with the respective right threaded bores 106 of the left coupling 33 and holes 123 positionable in register with the left threaded bores 106 of the right coupling 34 when the jig 121 is fitted to the two couplings 33, 34.

Formed in opposite left and right ends of the jig 121 are semicircular cutouts 124 so that the jig 121 will not close the bolt insertion holes 107 of the couplings 33, 34 when fitted to the couplings 33, 34.

Figure 12:
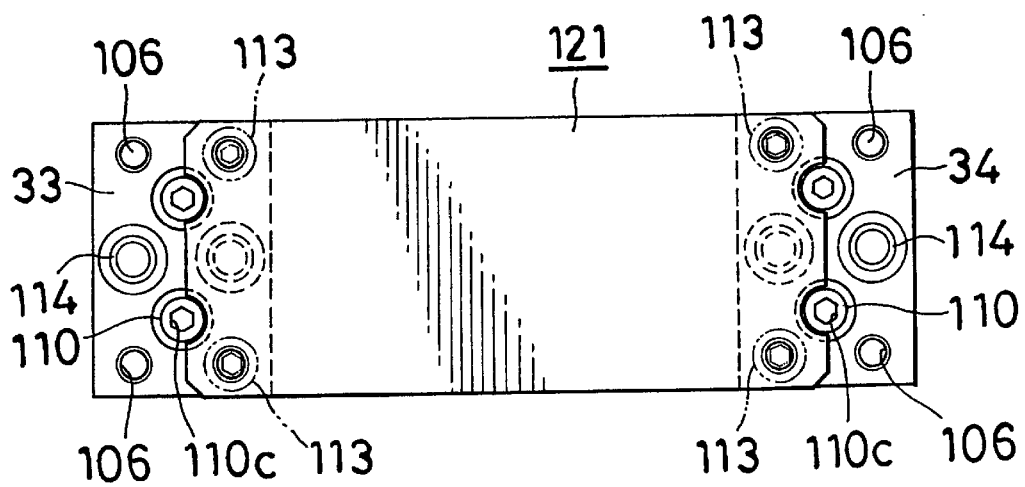
FIG. 12 is a plan view showing the final step of the same method.

To fix the couplings 33, 34 in position using the spacing jig 121, the coupling fixing bolt 110 is inserted through each of the bolt insertion holes 107 of each of the couplings 33, 34 along with the spacer 111 and rubber washer 112 and screwed slightly into the corresponding threaded bore 109 of the base plate 108 to temporarily hold the coupling to the base 108 to such an extent as not to permit the removal thereof. Next, the spacing jig 121 is used to fit the projections 122 thereof to the respective adjacent channel openings 114 of the coupling 33, 34, whereby the channel openings 114 of the two couplings 33, 34 are held spaced apart, with the hexagonal socket 110c of each bolt 110 left exposed as seen in FIG. 12. In this state, the massflow controller 3 is fixed in place with bolts 113, and the coupling fixing bolts 110 are tightened up with a wrench for full tightening.

The method described will not ensure that a line through the centers of the threaded bores 106 as arranged side by side is perpendicular to a line through the centers of the front and rear threaded bores 106, but is capable of fixing the couplings 33, 34 in position with the channel openings 114 thereof held spaced apart accurately. This feature is important for sealing. The method described is useful not only for fixing the left and right block couplings 33, 34, but also for fixing the couplings 31, 32, 33 shown in FIG. 4. The projections 122 on the spacing jig 121, although corresponding to the channel openings 114, may alternatively be made to correspond to the threaded bores 106 of the couplings 33, 34. More specifically, downward projections may be formed at the locations where the holes 123 are formed. This assures that a line through the centers of the threaded bores 106 as arranged side by side will be at a right angle with a line through the centers of the front and rear bores 106.

What is claimed is:

1. In fixing a plurality of lower members to a support member by screw members, each of the lower members being formed in an upper surface thereof with at least one bore serving as a reference for attaching an upper member, a lower member fixing method for use in fixing at least two lower members among the plurality of lower members so that the reference bores thereof are arranged side by side as spaced apart by a predetermined interval, the method being characterized by using a spacing jig formed on a bottom surface thereof with projections arranged side by side at a spacing equal to the predetermined interval between the reference bores, to the support member and fixing the lower members by tightening up the screw members with the projections of the spacing jig fitted in the respective reference bores of the lower members.

2. A spacing jig for use in a method according to claim 1 which is formed on a bottom face thereof with the projections arranged side by side at a spacing equal to the predetermined interval between the reference bores 106, 114 in the lower members.

3. In fixing a plurality of lower members to a support member by screw members each of the lower members being formed in an upper surface thereof with at least one bore serving as a reference for attaching an upper member, a lower member fixing method for use in fixing an unfixed one of the lower members to the support member having fixed thereto a specified number of lower members so that the reference bores of the unfixed lower member and the fixed lower member adjacent thereto are arranged side by side as spaced apart by a predetermined interval, the method being characterized by using a spacing jig formed on a bottom surface thereof with projections arranged side by side at a spacing equal to the predetermined interval between the reference bores and fixing the unfixed lower member to the support member by tightening up the screw members with the projections of the spacing jig fitted in the respective reference bores of the unfixed lower member and the fixed lower member adjacent thereto.

4. A spacing jig for use in a method according to claim 3 which is formed on a bottom face thereof with the projections arranged side by side at a spacing equal to the predetermined interval between the reference bores 106, 114 in the lower members.

* * * * *